US011083292B2

(12) United States Patent
Mehandjiysky et al.

(10) Patent No.: US 11,083,292 B2
(45) Date of Patent: Aug. 10, 2021

(54) ELECTRONIC DESK

(71) Applicant: HEWLETT-PACKARD DEVELOPMENT COMPANY, L.P., Spring, TX (US)

(72) Inventors: Dimitre Mehandjiysky, Spring, TX (US); Zheng Cao, Spring, TX (US); Kevin L. Massaro, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 303 days.

(21) Appl. No.: 16/342,152

(22) PCT Filed: Oct. 13, 2016

(86) PCT No.: PCT/US2016/056819
§ 371 (c)(1),
(2) Date: Apr. 15, 2019

(87) PCT Pub. No.: WO2018/071027
PCT Pub. Date: Apr. 19, 2018

(65) Prior Publication Data
US 2019/0231069 A1    Aug. 1, 2019

(51) Int. Cl.
*A47B 87/00* (2006.01)
*A47B 83/00* (2006.01)
(Continued)

(52) U.S. Cl.
CPC .......... *A47B 83/001* (2013.01); *A47B 13/081* (2013.01); *A47B 13/088* (2013.01);
(Continued)

(58) Field of Classification Search
CPC ....... A47B 9/10; A47B 13/081; A47B 13/088; A47B 21/00; A47B 83/001;
(Continued)

(56) References Cited

U.S. PATENT DOCUMENTS

| 4,920,458 | A  | * | 4/1990 | Jones | .................. A47B 83/001 248/917 |
| 7,492,577 | B2 | * | 2/2009 | Tomizuka | ............... A63F 13/08 361/679.27 |
| 9,261,262 | B1 |   | 2/2016 | Baloga | |
| 10,013,020 | B2 | * | 7/2018 | Hong | .................... G06F 1/1686 |
| 10,754,491 | B1 | * | 8/2020 | Baloga | .................. G06F 3/0481 |
| 2007/0097014 | A1 | * | 5/2007 | Solomon | ................ G06F 1/1662 345/1.1 |
| 2010/0148647 | A1 | * | 6/2010 | Burgess | ............... A47B 97/001 312/327 |
| 2010/0232100 | A1 | * | 9/2010 | Fukuma | .............. H04M 1/0216 361/679.01 |
| 2011/0038109 | A1 |   | 2/2011 | Hwang et al. | |

(Continued)

FOREIGN PATENT DOCUMENTS

JP          2004145784 A    *    5/2004

*Primary Examiner* — Joe H Cheng
(74) *Attorney, Agent, or Firm* — HP Inc. Patent Department

(57) ABSTRACT

An electronic desk includes at least two interactive panels hinged to a support structure. The interactive panels are hingeably positionable in at least a horizontal and vertical position. The electronic desk further includes a computing device to provide computing resources to the interactive panels. A plurality of virtual machines interfaceable at the interactive panels may be included in the computing device. At least one virtual machine is to be formed in the computing device in response to detecting a request from a second user logging onto the computing device via one of the interactive panels after a first user has logged onto the computing device. The computing device is to provide additional input interfaces on the at least two interactive panels associated with each of the at last one of the virtual machines of the computing device.

15 Claims, 9 Drawing Sheets

(51) Int. Cl.
  *G06F 3/0354* (2013.01)
  *A47B 13/08* (2006.01)
  *G06F 1/16* (2006.01)
  *G06F 3/01* (2006.01)
  *A47B 21/007* (2006.01)
  *A47B 9/10* (2006.01)

(52) U.S. Cl.
  CPC ............ *G06F 1/1652* (2013.01); *G06F 3/017* (2013.01); *G06F 3/03547* (2013.01); *A47B 9/10* (2013.01); *A47B 2021/0076* (2013.01); *A47B 2200/0042* (2013.01); *A47B 2200/0073* (2013.01); *G06F 2203/04102* (2013.01); *G09G 2380/02* (2013.01)

(58) Field of Classification Search
  CPC .... A47B 2021/0076; A47B 2200/0042; A47B 2200/0073; G06F 1/1652; G06F 3/017; G06F 3/03547; G06F 3/0481; G06F 2203/04102; G09G 2380/02
  See application file for complete search history.

(56) References Cited

U.S. PATENT DOCUMENTS

| | | |
|---|---|---|
| 2012/0004030 A1* | 1/2012 | Kelly ...................... G07F 17/34 463/31 |
| 2013/0083496 A1 | 4/2013 | Franklin et al. |
| 2014/0049464 A1 | 2/2014 | Kwak et al. |
| 2014/0130042 A1 | 5/2014 | Luxenberg et al. |
| 2015/0293641 A1* | 10/2015 | Chartier ................ G06F 1/1601 345/173 |
| 2016/0014403 A1 | 1/2016 | Stroetmann |
| 2016/0162179 A1* | 6/2016 | Annett ..................... G06F 3/167 715/709 |
| 2020/0268144 A1* | 8/2020 | Mehandjiysky ....... A47B 21/03 |

* cited by examiner

ELECTRONIC DESK

This is the U.S. National Stage of International Patent Application No. PCT/US2016/056819, filed Oct. 13, 2016, the entire contents of which are incorporated herein by reference.

BACKGROUND

As economies throughout the world grow, office space becomes even more of a major expense for businesses. This may be especially true in large metropolitan areas. With this expense in mind, businesses seek to utilize office space as economically as possible in order to provide workspace for more employees and reduce overhead associated with the office space.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
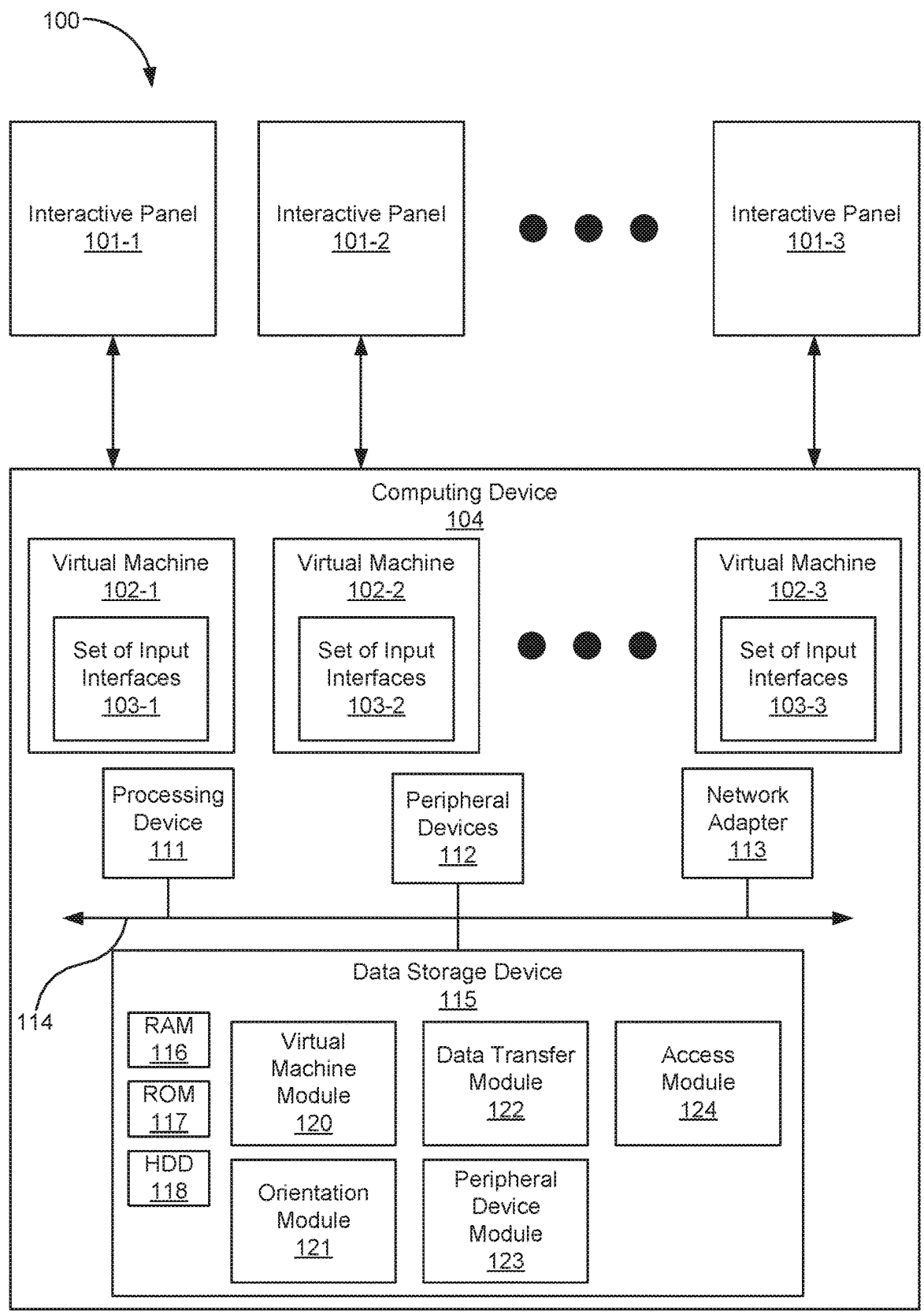
FIG. 1 is a block diagram of an electronic desk, according to one example of the principles described herein.

As mentioned above, businesses seek to utilize office space as economically as possible in order to provide workspace for more employees and reduce overhead associated with the office space. Many office spaces include cubicles or other stationary desks that are fixed in place and have very little ergonomic adjustability. Further, these stationary workspaces are difficult to install and reconfigure due to the equipment and tools used during the installation process. Installing or reconfiguring the workspaces may include hiring professional personnel at a considerable expense, which may be cost prohibitive, and especially so for smaller businesses and startups. Further, computing devices and similar electronic devices may be installed at the work spaces, but they are separately purchased, add to the setup of the workstation, and do not provide for an ergonomic and modular workspace that may be used in a wide variety of situations and use cases.

Further, the office work spaces described above have very little embedded technology and may, in some cases, simply include communication and power wiring. This non-integration of technology into the workspaces results in a greater inefficiency in workspace utilization and, consequently, increases overhead.

Examples described herein may provide an electronic desk. The electronic desk may include at least two interactive panels hinged to a support structure. The interactive panels are hingeably positioned in at least a horizontal and vertical position. The electronic desk further includes a computing device providing computing resources to the interactive panels. A plurality of virtual machines executable at the interactive panels may be included in the computing device. The virtual machines are formed in the computing device in response to detecting a request from a second user logging onto the computing device via one of the interactive panels after a first user has logged onto the computing device. The virtual machines provide additional input interfaces on the at least two interactive panels associated with a new virtual machine of the computing device. At least one of the interactive panels may be adjustable to a vertical position below a horizontal plane of the horizontal position. Further, at least one of the interactive panels may be adjustable between vertical positions above and below a horizontal plane of the horizontal position anywhere along at least 180 degrees. At least one of the interactive panels is a flexible interactive panel that creates a curved display when the flexible interactive panel is adjusted to a vertical position above a horizontal plane of the horizontal position. In one example, the computing device may be integrated into the interactive panels. Cabling may be integrated into the support structure to provide power and communication capabilities to the interactive panels. Further, at least one of the interactive panels is a touch screen device. The interactive panels may communicate with the computing device using wireless communications.

Examples described herein may also provide a modular interactive desk. The modular interactive desk may include at least one touch screen display device rotatably coupled to a support structure of the interactive desk. The at least one touch screen display device may be rotatable up to 270 degrees about an axis of rotation. The modular interactive desk may include computer hardware providing computing resources to the at least one touch screen display device, and a plurality of virtual machines of the computer hardware created based on a number of users logged onto the computing device via the at least one touch screen display device. Each virtual machine provides a set of individual input interfaces displayed on the at least one touch screen display device.

In one example, the at least one touch screen display device rotatably coupled to the support structure of the interactive desk is adjustable to a vertical position above a horizontal plane of a horizontal position of the at least one touch screen display device. The at least one touch screen display device is a flexible touch screen device that is flexible to a curved state to create a curved touch screen display device vertically positioned above at least a second touch screen display device that is oriented at the horizontal position.

A first one of the touch screen display devices may be adjustable from a horizontal position to a vertical position below a horizontal plane of the horizontal position, and a second one of the touch screen display devices is adjustable from the horizontal position to a vertical position above the horizontal plane of the horizontal position to form an interactive vertical board.

Examples described herein may further provide a computer program product for controlling the function of a modular electronic desk. The computer program product includes a non-transitory computer readable storage medium. The computer readable storage medium includes computer usable program code embodied therewith where the computer usable program code, when executed by a processor determines if a request is made from a second user to log onto a computing device associated with at least two interactive panels rotatably coupled at least one hinge of a support structure of the electronic desk. The request may be received via one of the interactive panels after a first user has logged onto the computing device via one of the interactive panels. In response to detecting the request from the second user logging onto the computing device, the computer usable program code, when executed by a processor, may create a plurality of virtual machines associated with the computing device, and provide additional input interfaces on the at least two interactive panels associated with each of the virtual machines of the computing device created.

The computer program product may further include computer usable program code to, when executed by the processor determine if movement of a first one of the at least two interactive panels from a horizontal position to a vertical position below a horizontal plane of the horizontal position and movement of a second one of the at least two interactive panels from a horizontal position to a vertical position above a horizontal plane of the horizontal position are detected. In response to a detection of movement of the first one of the interactive panels from the horizontal position to the vertical position below the horizontal plane of the horizontal position and detection of movement of the second one of the at least two interactive panels from the horizontal position to a vertical position above a horizontal plane of the horizontal position, computer usable program code, when executed by the processor, may instruct the first and second interactive panels to function as a single display device.

Further, the computer program product may further include computer usable program code to, when executed by the processor, determine if a coupling of a subsequent electronic desk to the electronic desk is detected, and in response to a detection of the coupling of the subsequent electronic desk to the electronic desk, communicating data between the subsequent electronic desk to the electronic desk as a daisy-chain network topology. Still further, the computer program product further includes computer usable program code to, when executed by the processor, determine if movement of a first one of the at least two interactive panels from a horizontal position to a vertical position above a horizontal plane of the horizontal position is detected. In response to a detection of movement of the first one of the interactive panels from the horizontal position to the vertical position above the horizontal plane of the horizontal position, the computer usable program code, when executed by a processor, may cause the first interactive panel to rotate an orientation of the display of images on the first interactive panel.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of an electronic desk (100), according to one example of the principles described herein. The electronic desk (100) may include at least one interactive panel (101-1, 101-2, 101-3, collectively referred to herein as 101). In one example, the electronic desk (100) may include a plurality of interactive panels (101). In an example, the electronic desk (100) may include two interactive panels (101). Even though three interactive panels (101) are depicted in FIG. 1, the electronic desk (100) may have fewer or more interactive panels than three.

The interactive panels (101) may be any electronic device capable of receiving input from a user and displaying information to the user. For example, the interactive panels may be touch screen devices, organic light emitting diode (OLED) devices, flexible organic light emitting diode (FOLED) devices, tablet devices, digitizer devices, high resolution display devices, other forms of interactive input and output devices, or combinations thereof.

In one example, the interactive panels (101) may be a touchscreen device. A touchscreen device is a both input device and output device where the input portion of the touchscreen device is layered on the top of an electronic visual display of an information processing system through which a user may provide input or control the information processing system. In this example, the touchscreen device may be interacted with through simple or multi-touch gestures by touching a screen with a stylus, at least one of the user's fingers or combinations thereof. In this manner, the touchscreen device enables the user to interact directly with what is displayed, rather than using a mouse, touchpad, or any other intermediate device. However, in one example, the touchscreen device may allow wired or wireless peripheral devices to interact with the touchscreen device and its supporting information processing system.

Each of the interactive panels (101) may be coupled to a computing device. (104). In one example, the computing device (104) may be integrated with the interactive panels (101). In this example, hardware devices making up the computing device (104) may be integrated into at least one of the interactive panels (101) or may be attached to or located within a portion of the electronic desk (100). In one example of the computing device (104) being attached to or located within a portion of the electronic desk (100), the computing device (104) may communicate with the interactive panels (101) via a bus.

In another example, the computing device (104) may be a separate device relative to the interactive panels (101). In this example, the computing device (104) may communicate with the interactive panels (101) via wired or wireless communication systems, devices, and protocols. In one example where the computing device (104) is a separate device relative to the interactive panels (101), the computing device (104) may be located away from the electronic desk (100). In this example, drivers and input interfaces (103) may be installed on the interactive panels (101) to allow the interactive panels (101) to communicate and interface with hardware devices of the computing device (104). In one example, the drivers may be operating system agnostic in order to function with any type of operating system.

The hardware resources of the computing device (104) may be virtually portioned to form at least one, and, in some examples, a plurality of virtual machines (102-1, 102-2, 102-3, collectively referred to herein as 102). A virtual machine (102) is any instance of a data-processing system such as the computing device (104) that appears to be at the exclusive disposal of a single user, but whose functions are accomplished by sharing hardware and software resources of the physical data-processing system. The virtual machines (102) may be, for example, hardware emulation, full virtualization, paravirtualization, and operating system-level virtualization virtual machines. Different virtual machines hosted by the computing device (104) may have the same or different privilege levels for accessing different resources. A hypervisor or other form of virtual machine manager may create at least one virtual machine (102) based on a number of users of the electronic desk (100). Because more than one user may fit around the electronic desk (100), more than one user may utilize the electronic desk (100) at a given time. The user's individual virtual machines (102) may be accessed by logging onto the computing device (104) through interaction with the interactive panels (101).

The presentation of the at least one virtual machine (102) on the interactive panels (101) may include the presentation of two virtual machines (102) on a single interactive panel (101). In this example, more than one virtual machine may be presented on, for example, the first interactive panel (101-1). In doing so, a first and second user may access the first interactive panel (101-1) by logging onto the computing device (104) and a virtual machine (102) of the computing device (104).

When a user logs onto the computing device (104), a virtual machine (102) provides that user with their own respective set of input interfaces (103). A set of input interfaces (103) may include presenting a first portion of the first interactive panel (101-1) for use by a first user and presenting a second portion of the first interactive panel (101-1) for use by a second user. In this manner, an area of the surface of the first interactive panel (101-1) is divided up to allow each of the first and second users to share the workspace of the first interactive panel (101-1).

Further, the set of input interfaces (103) may include a desktop, at least one icon, interactive pointers that track the movement of an input device, at least one window, and other interactive elements that allow a user to access and manipulate data on the computing device (104). The provisioning to a user his or her own respective set of input interfaces (103) allows all users to treat the electronic desk (100) as his or her own workspace, and utilize the functionality of the electronic desk (100), while still providing a group of users with a workspace at which the group may work in a collaborative environment or increase an office space density.

The computing device (104) of the electronic desk (100) may be implemented in an electronic device. Examples of electronic devices include servers, desktop computers, laptop computers, personal digital assistants (PDAs), mobile devices, smartphones, gaming systems, and tablets, among other electronic devices.

The computing device (104) may be utilized in any data processing scenario including, stand-alone hardware, mobile applications, through a computing network, or combinations thereof. Further, the computing device (104) may be used in a computing network, a public cloud network, a private cloud network, a hybrid cloud network, other forms of networks, or combinations thereof. In one example, the methods provided by the computing device (104) are provided as a service over a network by, for example, a third party. In this example, the service may include, for example, the following: a Software as a Service (SaaS) hosting at least one application; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof.

The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (104) are executed by a local administrator.

To achieve its desired functionality, the computing device (104) includes various hardware components. Among these hardware components may be a processor (111), a data storage device (115), peripheral device adapters (112), and network adapters (113). These hardware components may be interconnected through the use of busses and/or network connections. In one example, the processor (111), data storage device (115), peripheral device adapters (112), and a network adapter (113) may be communicatively coupled via a bus (114). Further, in the example described above regarding integration of the computing device and the interactive panels (101), the interactive panels (101) may communicate with the computing device (104) through the bus (114).

The processor (111) may include the hardware architecture to retrieve executable code from the data storage device (115) and execute the executable code. The executable code may, when executed by the processing device (111), cause the processing device (111) to implement the functionality of creating at least one virtual machine, providing hardware and software resources to the virtual machines, detecting a change in orientation of the interactive panels (101), changing display of information based on a change in the orientation of the interactive panels (101), transferring data between virtual machines (102), identifying coupling of two or more electronic desks (100), transferring data between two or more coupled electronic desks (100), detecting inputs from input devices including the interactive panels (101) and other peripheral devices (112), communicating with the interactive panels (101) and other computing devices, managing access to the computing device (104) and the virtual machines (102), performing other functions, or combinations thereof. Thus, when executed by the processing device (111), the executable code may cause the processing device (111) to implement the functionality provided according to the methods of the present specification described herein. In the course of executing code, the processing device (111) may receive input from and provide output to any one of the remaining hardware units.

The data storage device (115) may store data such as executable program code that is executed by the processing device (111) or other processing device. As will be discussed, the data storage device (115) may specifically store computer code representing at least one application that the processing device (111) executes to implement the functionality described herein.

The data storage device (115) may include various types of memory modules, including volatile and nonvolatile memory. For example, the data storage device (115) of the present example includes Random Access Memory (RAM) (116), Read Only Memory (ROM) (117), and Hard Disk Drive (HOD) memory (118). Many other types of memory may also be utilized, and the present specification contemplates the use of many varying type(s) of memory in the data storage device (115) as may suit a particular application of the principles described herein. In certain examples, different types of memory in the data storage device (115) may be used for different data storage needs. For example, in certain examples the processing device (111) may boot from Read Only Memory (ROM) (117), maintain nonvolatile storage in the Hard Disk Drive (HOD) memory (118), and execute program code stored in Random Access Memory (RAM) (116).

Generally, the data storage device (115) may include a computer readable medium, a computer readable storage medium, or a non-transitory computer readable medium, among others. For example, the data storage device (115) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having at least one wire, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (112, 113) in the computing device (104) enable the processing device (111) to interface with various other hardware elements, external and internal to the computing device (104). For example, the peripheral device adapters (112) may provide an interface to input/output devices, such as, for example, a mouse, or a keyboard. The peripheral device adapters (112) may also provide access to other external devices such as an external storage device, network devices such as, for example, servers, switches, and routers, client devices, other types of computing devices; and combinations thereof.

The display device may be provided to allow a user of the computing device (104) to interact with and implement the functionality of the computing device (104). The peripheral device adapters (112) may also create an interface between the processing device (111) and the display device, a printer, or other media output devices. The network adapter (113) may provide an interface to other computing devices within, for example, a network, thereby enabling the transmission of data between the computing device (104) and other devices located within the network.

The computing device (104) further includes at least one module used in the implementation of the functions of the systems described herein. The various modules within the computing device (104) include executable program code that may be executed separately. In this example, the various modules may be stored as separate computer program products. In another example, the various modules within the computing device (104) may be combined within at least one computer program product; each computer program product including at least one of the modules.

The computing device (104) may include a virtual machine module (120) to, when executed by the processing device (111), create and manage a at least one virtual machine (102) partitioned within the electronic desk. Creation of the virtual machines (102) may include creating a virtual machine for each user of the electronic desk (100). Each user may be assigned a username, password, or other credentials that allow that user to access the resources of the computing device (104). The credentials may be input to the electronic desk (100) via the interactive panels (101).

Management of the virtual machines (102) may include providing access to resources of the computing device (104) and the interactive panels (101) based on permissions assigned to the credentials. Management of the virtual machines (102) may also include dividing up and assigning an area of the surface of the interactive panels (101-1) to allow each of the users to share the workspace of the interactive panels (101). In one example, a single interactive panel (101) such as, for example, the first interactive panel (101-1) may include enough workspace for more than one user.

Thus, the virtual machine module (120) provides each of the plurality of users of the first interactive panel (101-1) with enough workspace of the first interactive panel (101-1) to utilize the functionality of their respective virtual machine (102) and its set of input interfaces (103). In one example, each virtual machine (102) may maintain a desktop environment providing virtual desktops for each user that logs into the interactive panels (101). A virtual desktop may represent an output, such as virtual machine graphical user interface (GUI) including an image or GUI to be displayed in order to represent each virtual machine (102) at the interactive panels (101), and generated by a desktop application running within virtual machine (102). Graphics data associated with the virtual desktop may be captured and transmitted to computing device (104), where each virtual machine's (102) GUI including, for example, the virtual desktop, may be rendered by a rendering agent and presented by the interactive panels (101).

In one example, the number of users allowed to log onto their respective virtual machines (102) at the electronic desk may be equal to the number of users whose workspace fits around the interactive panels (101) of the electronic desk (100). For example, if four users are able to physically fit around the electronic desk (100), then the electronic desk may allow up to four users to access their respective virtual machine (102) and segregate a portion of the interactive panels (101) for their personal use. In this example, if three users are utilizing the electronic desk (100) with two on one side of the electronic desk utilizing the first interactive panel (101-1) and the third user on the other side of the electronic desk (100) utilizing a second interactive panel (101-2), then the workspace of the two users utilizing the first interactive panel (101-1) may be divided on the first interactive panel (101-1) whereas the third user's workspace may be the undivided surface of the second interactive panel (101-2).

Further, in a situation where two users are utilizing the electronic desk (100), the two users may be located on one side of the electronic desk (100). In this example, the workspace of the interactive panel (101) the two users are located at may be divided between the two users. In this example, division of the workspace of the interactive panel (101) between the two users may be performed by instructing the virtual machine module (120) to cause a hypervisor of the virtual machines (102) to output their respective outputs to the interactive panel (101), and to instruct a graphics card or driver of the interactive panel (101) to stitch together two separate portions of the display area of the interactive panel (101) to display the two respective outputs of the two virtual machines (102). In this example, the operating systems of the two separate virtual machines (102) may be displayed as separate windows of the operating systems' respective graphical user interfaces (GUIs). Even though two separate virtual machines (102) are described here as dividing the workspace of the interactive panel (101), any plurality of divisions may be made based on the number of users and their respective virtual machines (102) dividing the workspace of the interactive panel (102).

In another example, multiple individuals positioned around the electronic desk (100) may each provide input sensed by the interactive panels (101). In this example, a single user may log onto one of the interactive panels (101), and the interactive panel (101) distinguishes between separate inputs by the multiple users. In this example, distinguishing between inputs form the multiple users may be based on the distance between inputs of the multiple users, a detected fingerprint of each of the multiple users, a speed, intensity, touch pressure or other touch aspect of each of the multiple users' touches, or other distinguishing aspects of the multiple users' interactions with the interactive panels (101).

In contrast to the above examples, if the two users are located on opposite sides of the electronic desk (100), then each user may utilize an undivided portion of their respective interactive panels (101) in an example where the electronic desk (100) includes two interactive panels (101).

The virtual machine module (120) may also ensure an appropriate division of hardware and software resources from the computing device (104) to the virtual machines (102). Each user, once logged onto the computing device (104) and their respective virtual machine (102), is provided these resources such that the user is unaware that others are also utilizing the resources of the computing device (104).

The computing device (104) may include an orientation module (121) to, when executed by the processing device (111), detect a change in orientation of the interactive panels (101). In one example, accelerometers, gyroscopes or other orientation detecting devices may be used to detect an orientation of the interactive panels (101). As will be described in more detail below, the interactive panels (101) may be re-oriented to, from, and between vertical and horizontal positions. In such a case, the computing device (104) may detect the re-orientation of the interactive panels (101) through the use of sensors or other devices that trigger such an indication. The orientation module (121) may adjust or change the display of information based on a detected change in the orientation of the interactive panels (101). For example, when in a horizontal position, the interactive panels (101) may orient data, a desktop, icons, text, windows, and other displayable information in an orientation that allows a user, when utilizing the electronic desk (100), to read and view the displayable information. If an interactive panel (101) is re-oriented from a horizontal position to a vertical position, the display of this displayable information may be rotated, adjusted, or reoriented to allow the users to read and view the displayable information. In this manner, the orientation module (121) serves to ensure that the information displayed on the interactive panels (101) is oriented in a manner such that a user may view the displayed information despite how the interactive panels (101) are oriented.

The computing device (104) may include a data transfer module (122) to, when executed by the processing device (111), transfer data between interactive panels (101), between virtual machine (102) instances, between coupled electronic desks (100), or combinations thereof. In some situations, it may be advantageous to transfer documents from one user's device to another user's device. Because the virtual machines (102) are presented on interactive panels (101) that are coupled to one another through the computing device (104), and because the interactive panels (101) are coupled to one another and may be coupled to interactive panels (101) located in a second electronic desk (100), document transfer may be facilitated through the use of the bus (114) or other data transfer channels and devices. In another example, document transfer between coupled electronic desks (100) may be facilitated via the use of a shared data storage device. A first of the two electronic desks (100) may provide a disk location of data representing the file within the shared data storage device to the second electronic desk (100), or a first user may provide the disk location of data representing the file within the shared data storage device to a second user. In this example, the shared data storage device may be local to one of the electronic desks (100), or may be remote from both electronic desks (100). If any user modifies the file, then a new copy of the file may be saved either locally or on the shared data storage device.

In one example, the transfer of a file may include the movement of the file from one interactive panel (101), virtual machine (102) instance, or coupled electronic desk (100) by dragging an icon representing the file to another interactive panel (101), virtual machine (102) instance, or coupled electronic desk (100). In another example, the transfer of the file may include the movement of the file from one interactive panel (101), virtual machine (102) instance, or coupled electronic desk (100) through a command from which a recipient is chosen by a first user and the file is transferred to the recipient's virtual machine (102) that may be located on a separate interactive panel (101), electronic desk (100), or combinations thereof. In this manner, the data transfer module (122) makes transferring of data to, from, and between interactive panels (101), virtual machines (102) instance, coupled electronic desks (100), or combinations thereof more simple, intuitive, and convenient for the users. This may be especially convenient in scenarios where the users are grouped together electronic desks (100) for collaborative purposes.

The data transfer module (122), when executed by the processing device (111), may also be used to identify when two or more electronic desks (100) are coupled together. As will be described in more detail below, a first electronic desk (100) may be coupled to at least one other electronic desk (100). The plurality of coupled electronic desks (100) may be coupled in any type of network configuration or topology. In one example, the network topology used to couple the plurality of electronic desks (100) may be a daisy chain network topology. In a daisy chain topology, the electronic desks (100) are connected in either a linear or circular series. Data transferred from one electronic desk (100), e.g. using the data transfer module (122), to a virtual machine (102) located on an electronic desk (100) partway down the daisy chain bounces along in sequence until it reaches the destination electronic desk (100). The electronic desks (100) may be coupled using any network topology including, for example, a point-to-point network topology, a mesh network topology, a fully connected network topology, a partially connected network topology, a star network topology, a tree network topology, a fully connected network topology where every electronic desk (100) is coupled to every other electronic desk (100) without an intervening electronic desk (100), a bus network topology, or combinations thereof. The ability to couple two or more electronic desks (100) together allows organizations to chain several electronic devices (100) together in a variety of configurations and orientations. This may allow the organization to utilize precious office space as they deem most economical while still allowing for future reconfiguration if desired.

As for the physical coupling of at least two electronic desks (100) together, in one example, magnets may be used to snap connectors such as pogo pins together. Pogo pins are devices used in electronics to establish a temporary connection between two electronic devices, and include a cylinder containing two sharp, spring-loaded pins. When pressed between two electronic circuits, the sharp points at each end of the pogo pin make secure contacts with the two circuits and thereby connect them together. However, any type of physical connection may be used to communicatively couple the two or more electronic desks (100) together. Once communicatively coupled, the two or more electronic desks (100) may be secured together using latches, for example. In this manner, the risk of decoupling the two or more electronic desks (100) accidentally or unintentionally is reduced or eliminated.

The data transfer module (122), when executed by the processing device (111), may also be used to communicate with the interactive panels (101), the virtual machines (102), between interactive panels (101), between virtual machines (102), with other electronic desks (100), between electronic desks (100), and to communicate with other computing devices outside an electronic desk (100). Communications between elements of the electronic desks (100) may be handled in a different manner as communications between the electronic desk (100) and the other computing devices outside an electronic desk (100).

The computing device (104) may also include a peripheral device module (123) to, when executed by the processing device (111), detect inputs from any type of input device including the interactive panels (101) and other peripheral devices (112). As mentioned above, the interactive panels (101) may be touchscreen devices that allow for interaction from users to be input to the computing device (104) for processing. As mentioned above, the workspace of a first interactive panel (101) may be divided between a plurality of users to allow the plurality of users to both interact with the first interactive panel (101) and their respective virtual machines (102) executed by the computing device (104). In this example, the virtual machine module (102), a hypervisor of the virtual machines (102), or combinations thereof may detect input from the plurality of users, and distinguish inputs between the users by detecting whether the input was made at a location within the respective users' separate windows of their operating systems as displayed on the interactive panel (101). Upon detection of which window was interacted with, the virtual machine module (102), a hypervisor of the virtual machines (102), or combinations thereof send that input to the virtual machine (102) associated with that respective window. The virtual machine (102) then uses the input to provide feedback regarding the user's input for display on that user's portion of the interactive panel (101). In this manner, each user whose virtual machine (102) shares a divided portion of the workspace of an interactive panel (101) may interact with his or her respective virtual machine (101) without the virtual machines (102) receiving input via the interactive panel (101) from a user not associated with the virtual machine (102).

Further, other peripheral devices (112) may be used as input devices such as, for example a mouse, a keyboard, an image scanner, a tape drive, a microphone, a speaker, a webcam, a digital camera, a digital watch, a smartphone, a tablet computing device, inductive charging devices, a touchscreen device, a barcode reader, a game controller, a light pen, a printer, a projector, other peripheral devices, or combinations thereof. Input and output to and from the peripheral devices (112) may be transmitted using the peripheral device module (123) and various wired and wireless communication channels provided by the bus (114), the network adapters (113) and their associated communications protocols. In order for the respective virtual machines (102) to not receive input from peripheral devices (112) not associated with the respective virtual machines (102), the peripheral devices (112) may utilize a handshake process to provide authentication information, encryption information, pairing, bonding, or a combination thereof. In one example, the peripheral devices (112) may use a BLUETOOTH wireless communication technology developed and distributed by the Bluetooth Special Interest Group to pair and bond a particular peripheral device (112) such as a wireless mouse or wireless keyboard to a particular virtual machine (102). In this example, the interactive panels (101) or the computing device (104) may detect the presence of a BLUETOOTH-capable device, and associate that particular device with one of the virtual machines (102). During the pairing or bonding process, a user may select the virtual machine (102) to pair or bond with the peripheral device (112). Other forms of wireless communications may also be used to securely and particularly pair a peripheral device (112) to a particular virtual machine (102) including, for example, IEEE 802.11 communications standards, near-field communications (NFC) standards, other wireless communications standards, or combinations thereof. In this manner, various peripheral devices (112) may be used to control a particular one of the virtual machines (102) in addition to or as a supplement to the input interfaces provided at the interactive panels (101) for each of the virtual machines (102).

The computing device (104) may also include an access module (124) to, when executed by the processing device (111), detect a request to access the electronic desk (100) and provide such access based on credentials received from a user. In one example, a user of the electronic desk (100) may access the associated computing device (104) and his or her virtual machine (102) by entering a username, password, or other credentials into an interface located on the interactive panels (101). In this example, an area of the interactive panels (101) may be reserved for entry of the user's credentials. In another example, an area of the interactive panels (101) may be divided from another area of the interactive panels (101) upon a user activating a login button or other icon located on the interactive panels (101). In these examples, a login screen may be presented to a user to allow the user to enter his or her credentials.

The access module (124), when executed by the processing device (111), may also provide various levels of access based on, for example, the user's administrative permissions or level. In this example, IT personnel may be given access to all virtual machines (102) in the computing device (104) in order to provide IT-related services to the individual users of the virtual machines (102) and the computing device (104). In contrast, non-IT personnel may be granted permissions associated with their credentials that limit their access to their respective virtual machine (102). The access module (124) may be used to set permissions associated with the user's credentials.

The physical aspects of the electronic desks (100) will now be described in connection with FIGS. 2 through 5 along with FIG. 1. FIGS. 2 through 5 depict various configurations of the electronic desk (100). The configurable nature of the electronic desk (100) and the modularity thereof allows for the electronic desk (100) to be useful in a myriad of scenarios and environments, and allows the electronic desk (100) to be used for multiple purposes. This results in a lower cost to a user since the electronic desk (100) serves so many needs, other pieces of furniture in, for example, an office environment is not purchased.

Figure 2:
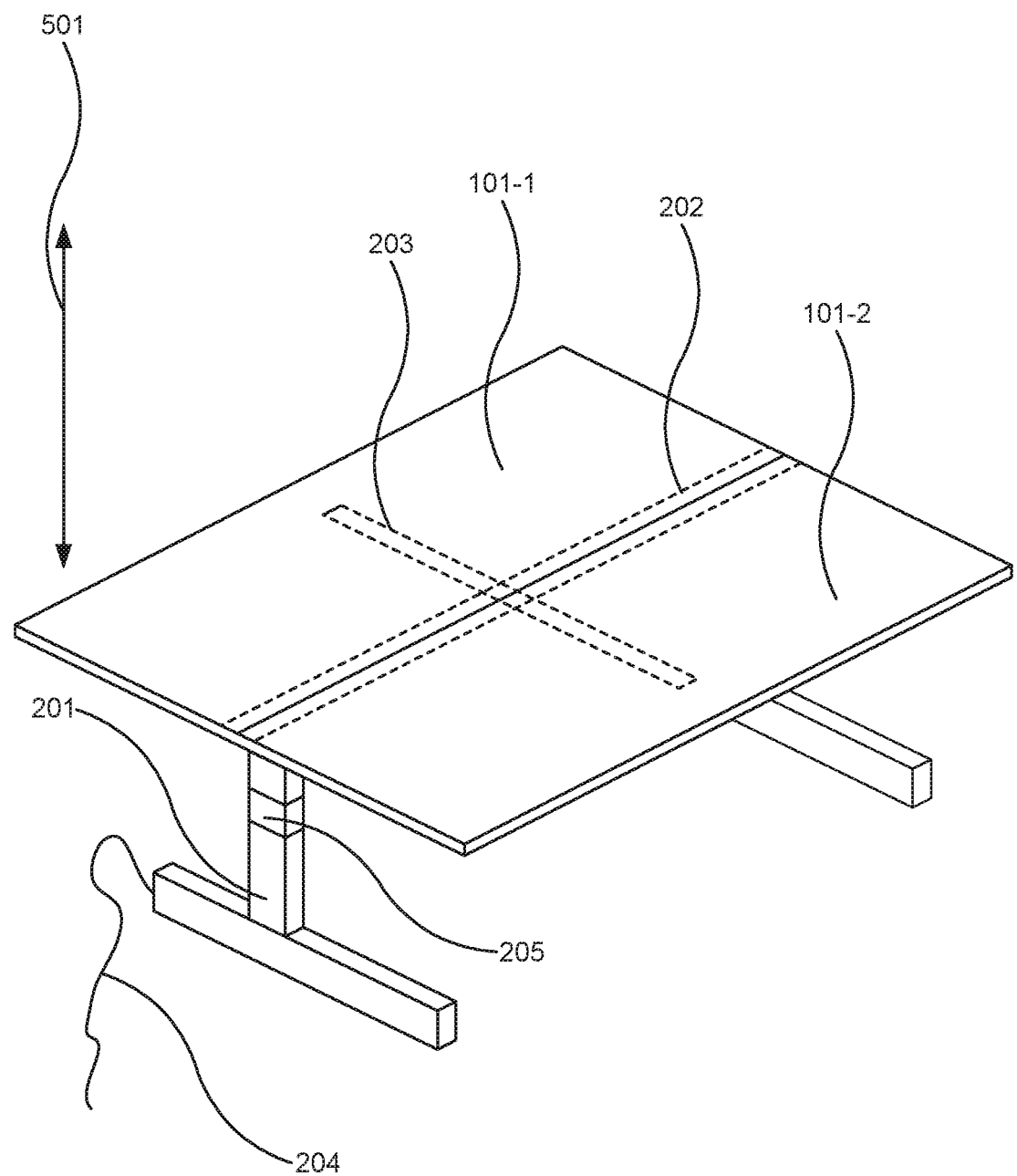
FIG. 2 is a diagram of the electronic desk of FIG. 1 in a horizontal configuration, according to one example of the principles described herein.
Figure 3:
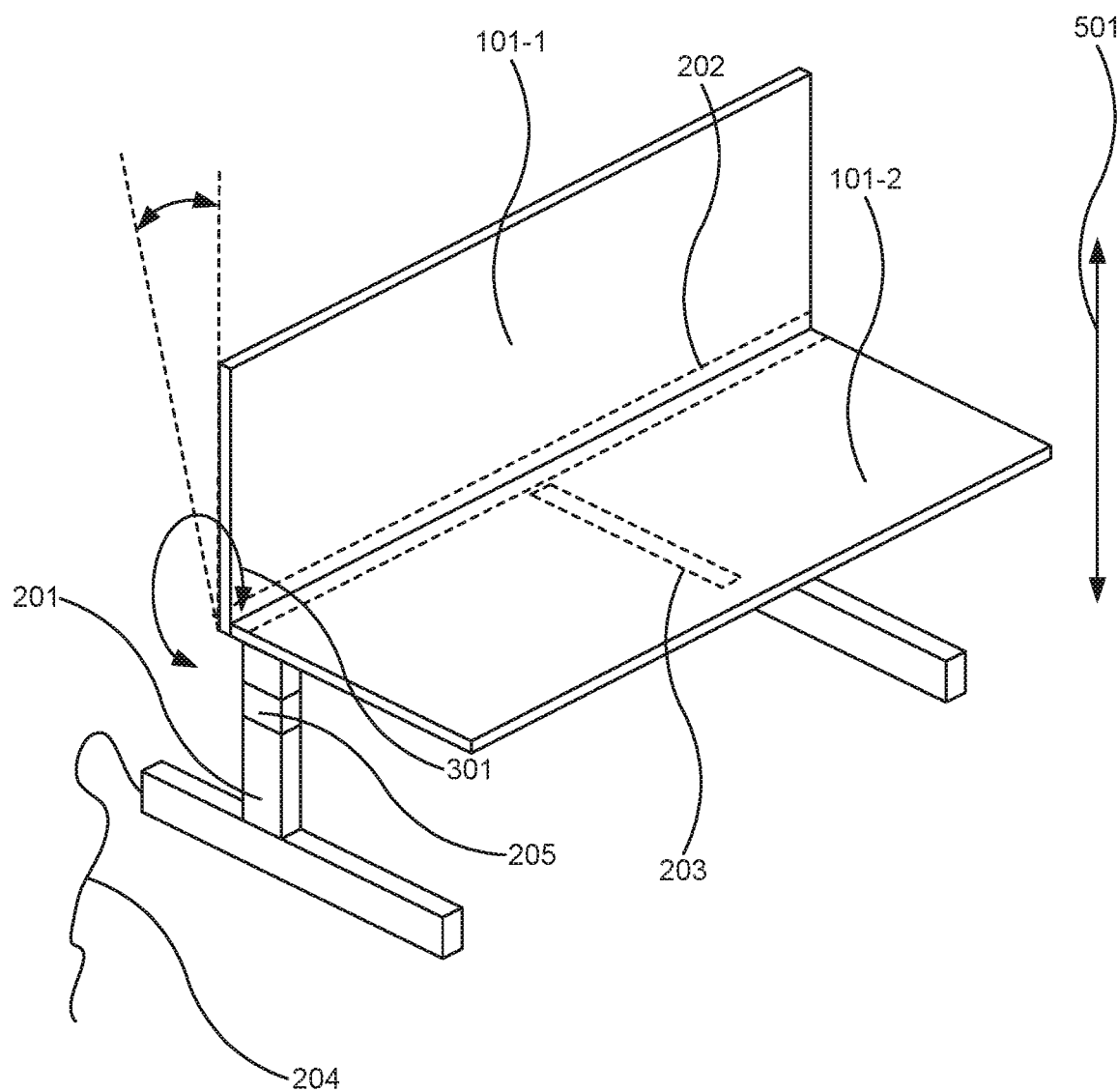
FIG. 3 is a diagram of the electronic desk of FIG. 1 in an L-shaped configuration, according to one example of the principles described herein.
Figure 4:
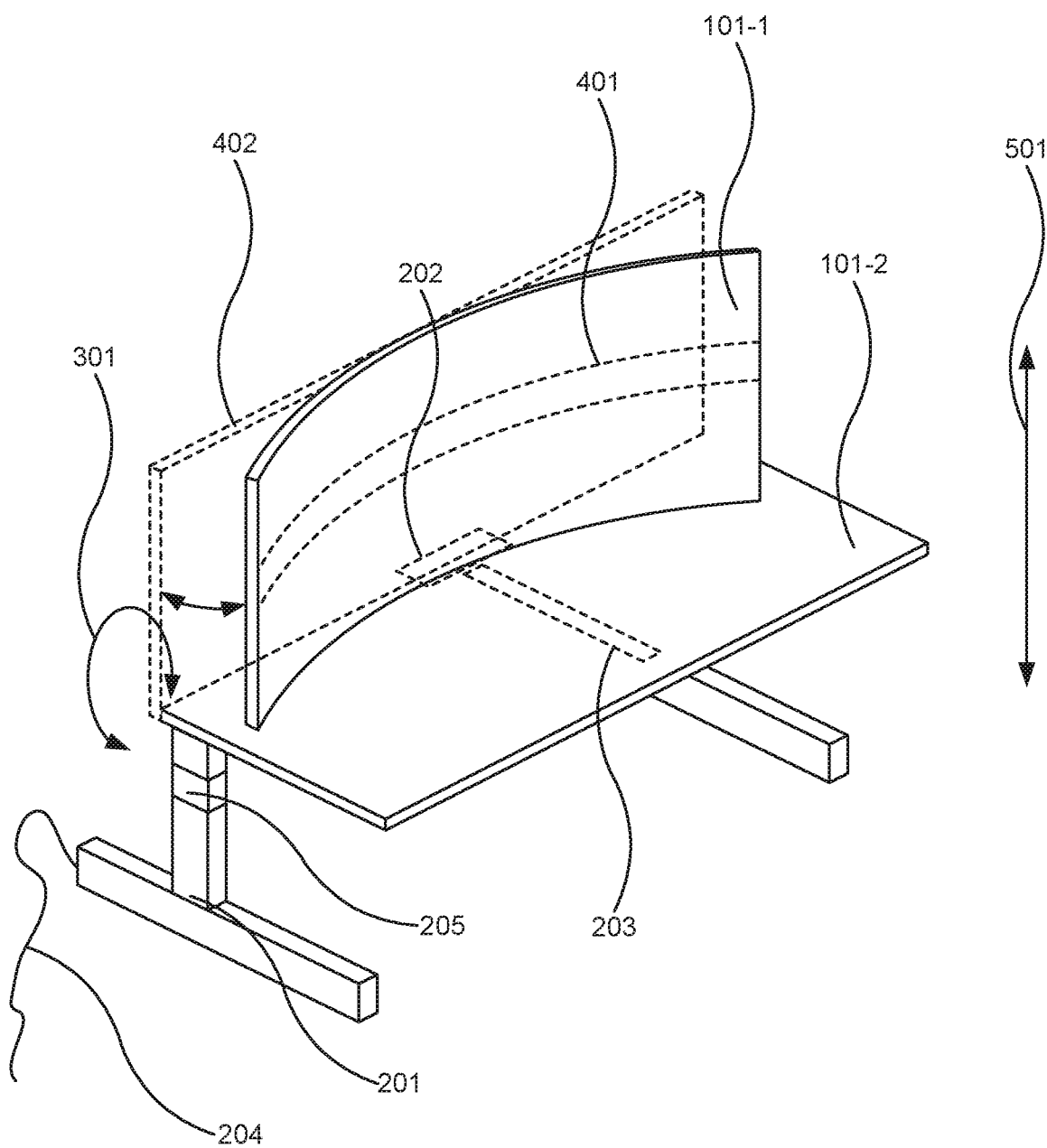
FIG. 4 is a diagram of the electronic desk of FIG. 1 in an L-shaped, curved display configuration, according to one example of the principles described herein.
Figure 5:
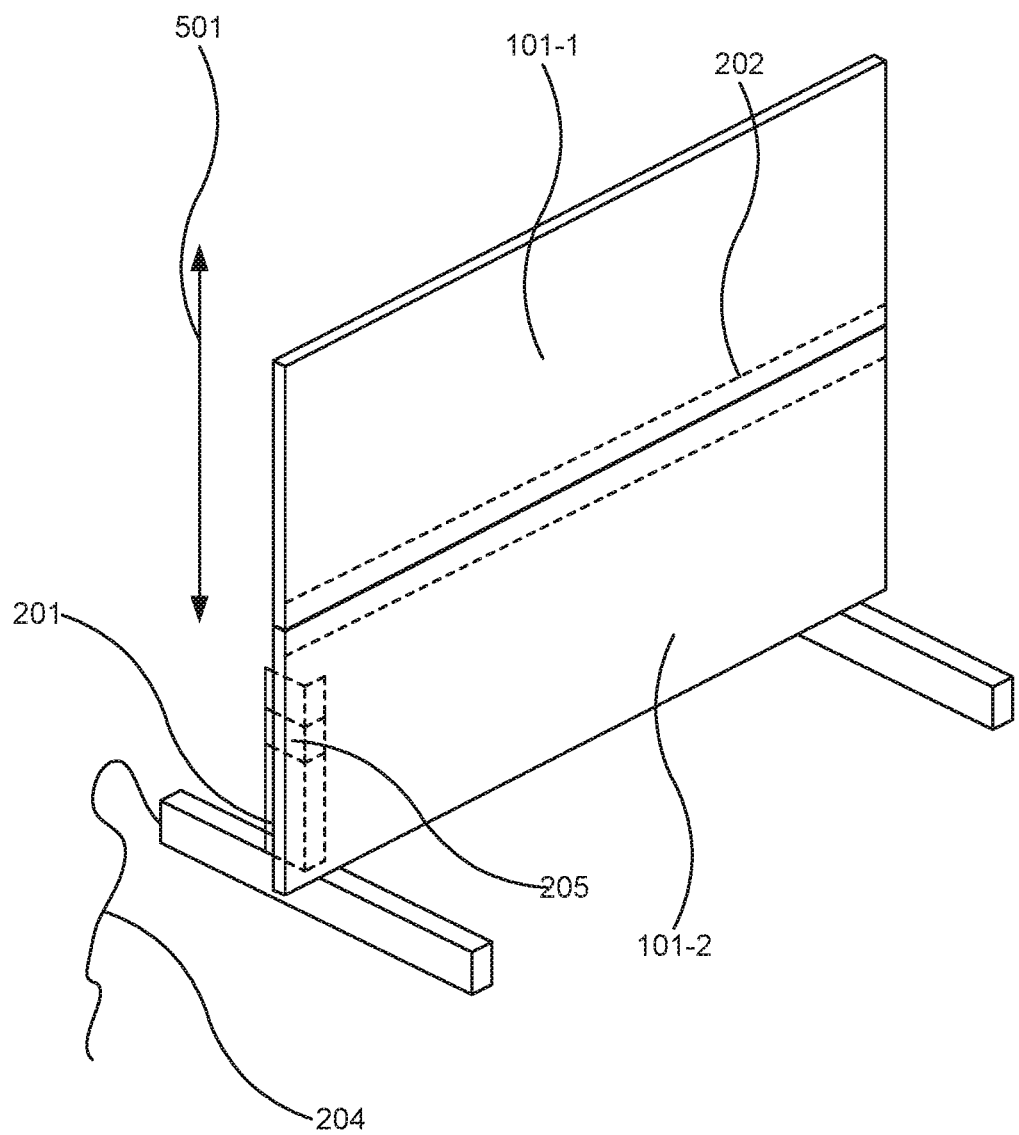
FIG. 5 is a diagram of the electronic desk of FIG. 1 in a vertical configuration, according to one example of the principles described herein.

FIG. 2 is a diagram of the electronic desk (100) of FIG. 1 in a horizontal configuration, according to one example of the principles described herein. FIG. 3 is a diagram of the electronic desk (100) of FIG. 1 in an L-shaped configuration, according to one example of the principles described herein. FIG. 4 is a diagram of the electronic desk (100) of FIG. 1 in an L-shaped, curved display configuration, according to one example of the principles described herein. FIG. 5 is a diagram of the electronic desk (100) of FIG. 1 in a vertical configuration, according to one example of the principles described herein.

The electronic desk (100) includes a support structure (201) that serves to support the electronic desk (100) in its various configurations. The support structure (201) may include horizontal and vertical posts that cause the electronic desk (100) to remain stationary when forces are applied to it from any direction, and to prevent the electronic desk (101) from tipping over.

At least one hinge (202) may be coupled between the support structure (201) and the interactive panels (100) to allow the interactive panels (101) to hinge from a horizontal position as depicted in FIG. 2, to a vertical position as depicted in FIGS. 3 through 5. Although one hinge (202) is depicted in the figures, a plurality of hinges may be included. The hinge (202) may be any type of hinge that can support the weight of the interactive panels (101). In one example, the hinge may be an articulating hinge that allows the interactive panels (101) to move apart from one another as the interactive panels (101) rotate about the hinge (202). In one example, the hinges (202) may also be a position, torque, or friction hinge that allows the interactive panels (101) to move about the hinge (201) while holding the rotational position of the interactive panels (101) at any point throughout the range of rotation much like a hinge on a laptop computing device. In one example, the tolerances of the hinges (201) and the friction provided by the hinges (201) removes any freedom of movement of the interactive panels (101) when not being forced by a user to a particular position. In another example, the interactive panels may be held in position using locking mechanisms that are engaged as the interactive panel (101) passes a certain point along the hingable rotation, and released using a release mechanism.

In one example, the hinges (202) may allow an interactive panel (101) to rotate about the hinges (202) at least 270 degrees as indicated in connection with interactive panel (101-1) in FIG. 3. In this example, the interactive panels may rotate from a vertical, down position of interactive panel (101-2) as depicted in FIG. 5, to a position where the interactive panel (101) is upside down on top of the other interactive panel (101). This range of movement allows the interactive panel to be positioned above the horizontal plane in an approximately vertical position as depicted in connection with FIGS. 3 through 5 and allowing the interactive panel (101) to be moved past that vertical position if, for example, a user desires to move the interactive panel (101) past that vertical position to allow the contrast of the display of the interactive panel (101) to be properly viewed. This may prove helpful in the likely situation where the user is seated at the front of interactive panel (101-2) and using interactive panel (101-1) as a display like the configuration depicted in FIGS. 3 and 4.

In one example, the interactive panels (101) may be supported when in a horizontal position by at least one moveable support (203). As depicted in FIG. 2, the moveable supports (203) may be extended beneath the interactive panels (101) so that objects may be placed on top of the interactive panels (101). When the interactive panels (101) are oriented in a vertical position either below or above the horizontal plane of the horizontal position depicted in FIG. 2, the moveable supports (203) may be moved to center portion of the electronic desk (101) underneath, for example, the hinges (202) to allow for the moveable supports (203) to not obstruct the interactive panels (101) or a user's access to the interactive panels (101) when lowered below the horizontal plane or raised above the horizontal plane as depicted in FIGS. 3 through 5.

The electronic desk (100) may include cables or wires built into the support structure (201). In one example, the cable and wires may be retractable into the support structure (201). The cables or wires may include power cables and communication cables used to provide power and communication capabilities, respectively, to the computing device (104) and the interactive panels (101). In one example, however, the computing device (104) and the interactive panels (101) may communicate wirelessly. In this example, communication cables may not be incorporated into the support structure (201). The embedding of the cables into the support structure (201) add cable management functionality to the electronic desk (100), remove clutter in the area of the electronic desk (100), and provide for a more aesthetically pleasing furniture product.

The electronic desk (100) may also include a hydraulic lift (205). The hydraulic lift (205) allows for the height of the electronic desk (100) to be raised or lowered to an appropriate height of a user who is seated at the hydraulic lift (205). Further, as depicted in FIG. 5, the hydraulic lift (205) allows for the height of the electronic desk (100) to be raised or lowered as indicated by arrow (501) to accommodate the vertical configuration of the two interactive panels (101-1, 101-2). In the example of FIG. 5, one of the interactive panels (101-1) is raised above the horizontal plane to a vertical position, and the other interactive panel (101-2) is lowered below the horizontal plane to a vertical position. This configuration of the electronic desk (100) creates an interactive wall. The interactive wall may be useful in situations where a group or team of users are collaborating together, and may be used to display graphics and text, or may be used as a data input device much like a chalkboard, whiteboard, smartboard, or digital board may be used.

When in the interactive wall configuration of FIG. 5, the orientation module (121) and the data transfer module (122) may cause the two interactive panels (101-1, 101-2) of the electronic desk (100) to work as a single input/output display device. However, a user may define how the interactive panels (101-1, 101-2) are used in the interactive wall configuration, including having one act as an input device and the other as an output device. Again, the ability to reconfigure the arrangement of the interactive panels (101) allows for the electronic desk (100) to be utilized in a myriad of different ways and reduces overhead costs to an organization by eliminating the need to purchase additional furniture.

As mentioned above, at least one of the interactive panels (101) may be a flexible display. With reference to FIG. 4, the flexible interactive panel (101-1) may be a flexible OLED display device. The flexible interactive panel (101-1) allows a user to experience a more immersive environment provided by a curved display device. In one example, a bi-directional, extendable support (401) may be included on the back side of the flexible interactive panel (101-1). The extendable support (401) may be torqued to allow a level of resistance such that once the extendable support (401) is actuated, the flexible interactive panel (101-1) does not return back to a flat, non-curved state (402).

In one example, one of the two interactive panels (101) may be a flexible OLED input/output device, while the other interactive panel (101) may be a non-flexible input/output touchscreen device. Having one of the two interactive panels (101) be a flexible OLED input/output device and not the other allows for the product to be less expensive. However, in another example, both or neither of the interactive panels (101) may be a flexible OLED input/output device. Selection of the type of interactive panel (101) may be made by a consumer at the time of purchase in order to fit the consumer's preferences.

With reference now to FIGS. 3 and 4, the placement of the first interactive panel (101-1) in a vertical position allows for at least one user to use the first interactive panel (101-1) as a display device. In these examples, however, the functionality of the first interactive panel (101-1) may be adjusted or remain the same. For example, when brought to a vertical position, the input or touchscreen capabilities of the first interactive panel (101-1) may be turned off by, for example, the orientation module (121). In this example, the first interactive panel (101-1) functions as a display device with no direct input through its touchscreen. In another example, the orientation module (121) may cause the first interactive panel (101-1) to retain its touchscreen functionality. The retention or removal of functionality of the interactive panels (101) based on orientation may be user-definable. Further, in these examples, the orientation module (121) may either retain or restrict functionality of the second interactive panel (101-2). In one example, the output functionality of the second interactive panel (101-2) apart from any input interfaces (103) displayed on the second interactive panel (101-2) such as a keyboard, a mouse or similar input interfaces may be restricted. In this example, the second interactive panel (101-2) functions as an input device. Thus, in some examples, the orientation module (121) may cause the functionality of the first interactive panel (101-1) to change the function of the second interactive panel (101-2) based on the orientation of first interactive panel (101-1).

Figure 6:
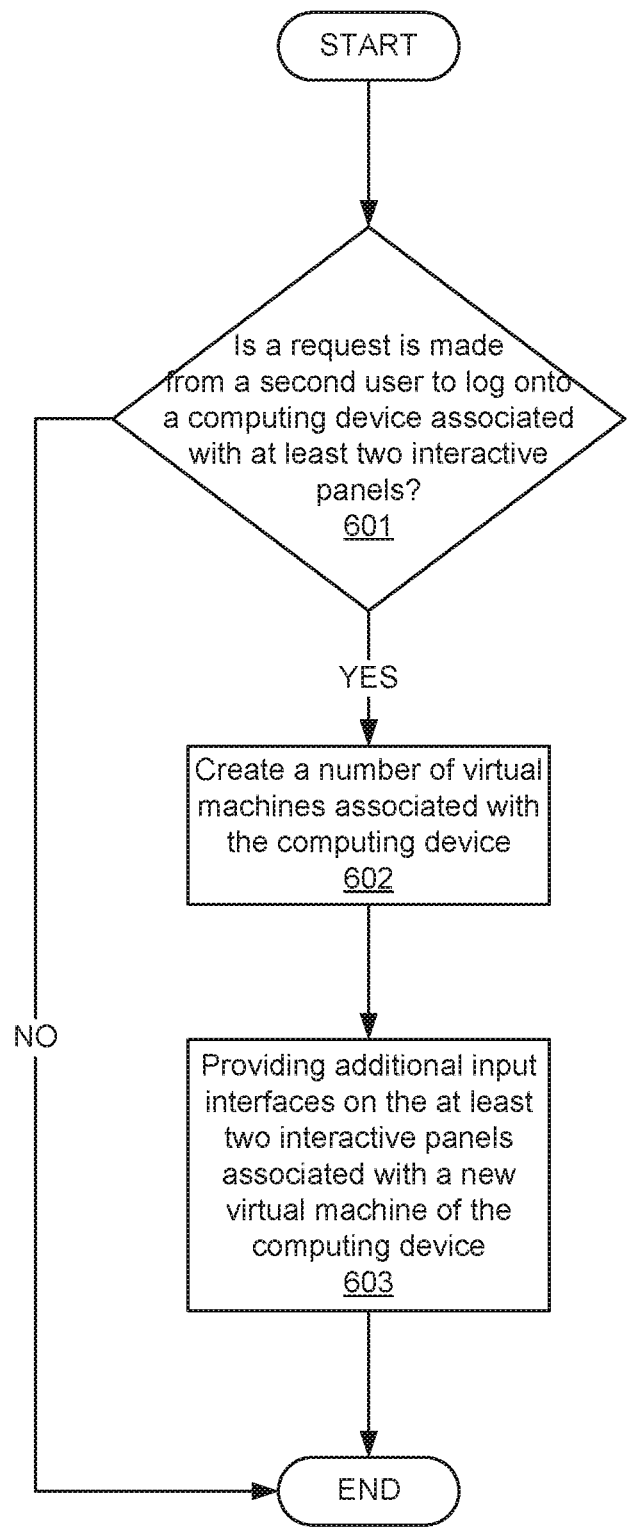
FIG. 6 is a flowchart depicting a method of controlling the function of a modular electronic desk, according to one example of the principles described herein.

Moving on with the figures, FIG. 6 is a flowchart depicting a method of controlling the function of a modular electronic desk (100), according to one example of the principles described herein. The method of FIG. 6 may include determining (block 601) whether a request is made from a second user to log onto a computing device associated with at least two interactive panels (101) rotatably coupled by at least one hinge of a support structure (201) of the electronic desk (101). The request may be received via one of the interactive panels (101) after a first user has logged onto the computing device (104) via one of the interactive panels (101).

In response to detecting the request from the second user logging onto the computing device (block 601, determination YES), at least one virtual machine (102) associated with the computing device (104) may be created (602), and additional input interfaces (103) on the at least two interactive panels (101) associated with a new virtual machine (102) of the computing device (104) may be provided (block 603). In response to not detecting a request from the second user logging onto the computing device (block 601, determination NO), the method may terminate.

Figure 7:
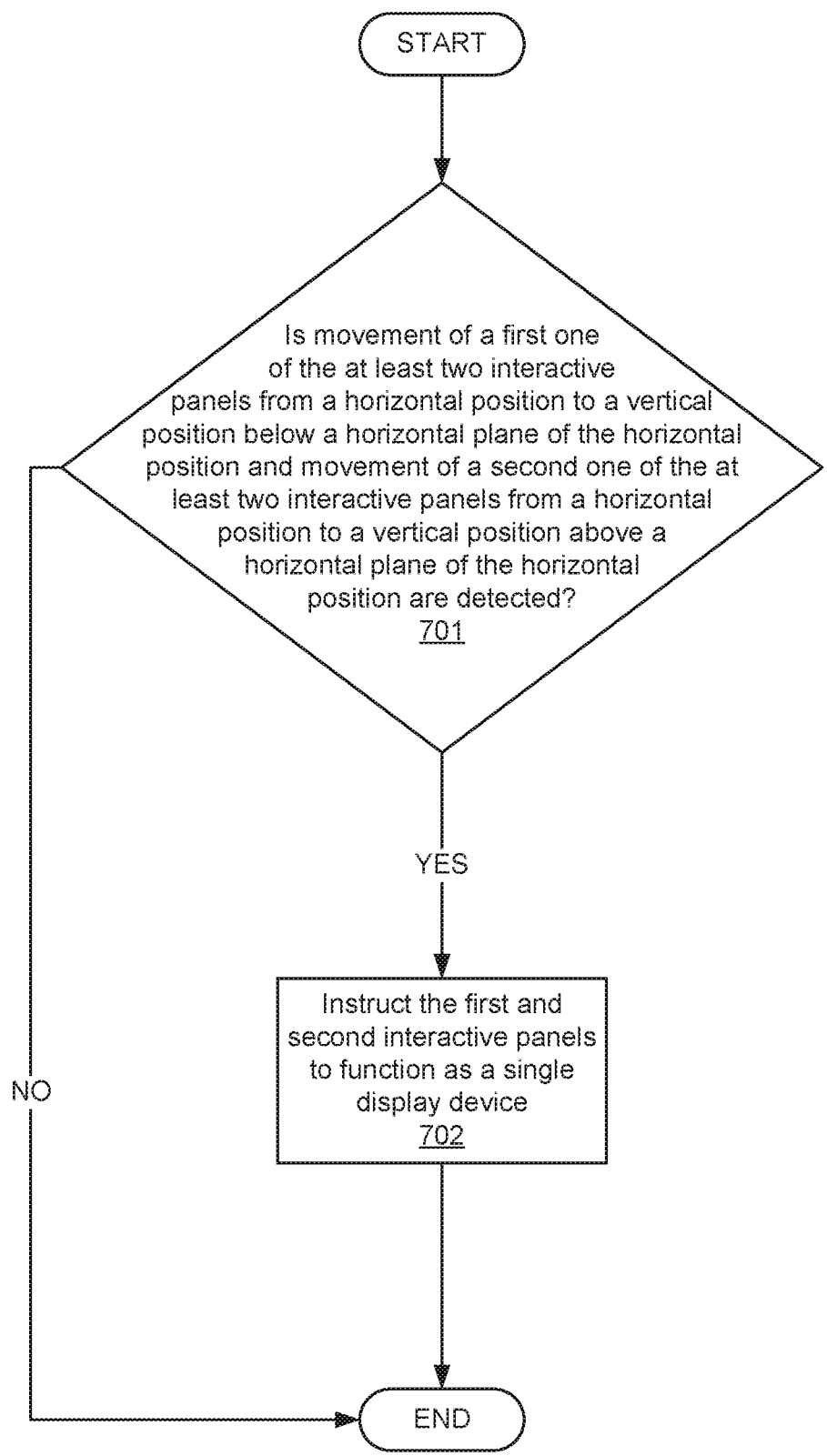
FIG. 7 is a flowchart depicting a method of controlling the function of a modular electronic desk, according to another example of the principles described herein.

FIG. 7 is a flowchart depicting a method of controlling the function of a modular electronic desk (100), according to another example of the principles described herein. The method of FIG. 7 may include determining (block 701) if movement of a first one of the at least two interactive panels (101) from a horizontal position to a vertical position below a horizontal plane of the horizontal position and movement of a second one of the at least two interactive panels (101) from a horizontal position to a vertical position above a horizontal plane of the horizontal position are detected. As described above in connection with FIG. 5, the interactive panels (101) may form an interactive wall for use in, for example, collaborative environments or situations. In response to a detection of movement of the first and second interactive panels (101) as described at block 701, the first and second interactive panels (101) may be instructed (block 702) to function as a single display device. In this manner, the interactive wall mode of the electronic desk (100) may serve as a type of data input device much like a chalkboard, whiteboard, smartboard, or digital board. In response to not detecting movement of the first and second interactive panels (101) as described at block 701 (block 701, determination NO), the method may terminate.

Figure 8:
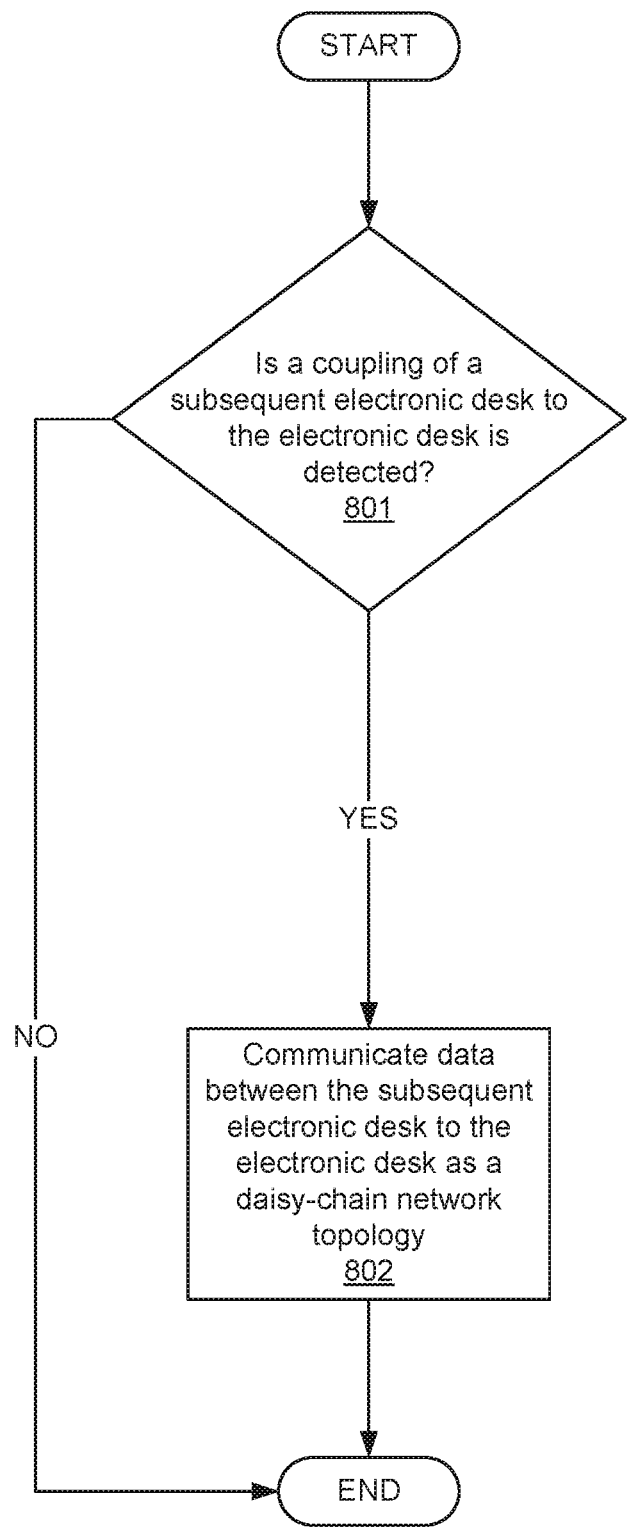
FIG. 8 is a flowchart depicting a method of controlling the function of a modular electronic desk, according to still another example of the principles described herein.

FIG. 8 is a flowchart depicting a method of controlling the function of a modular electronic desk (100), according to still another example of the principles described herein. The method of FIG. 8 may include determining (block 801) if a coupling of a subsequent electronic desk (100) to the electronic desk (100) is detected. As described above, a plurality of electronic desks (101) may be coupled together to form a network of electronic desks (100). In response to a detection of the coupling of the subsequent electronic desk (100) to the electronic desk (100) (block 801, determination YES) data between the subsequent electronic desk (100) to the electronic desk (100) as a daisy-chain network topology may be communicated (block 802). In this manner, data and files may be sent between coupled electronic desks (100) as well as between virtual machines (102) and interactive panels (101). In response to not detecting a coupling of a subsequent electronic desk (100) to the electronic desk (100) (block 801, determination NO), the method may terminate.

Figure 9:
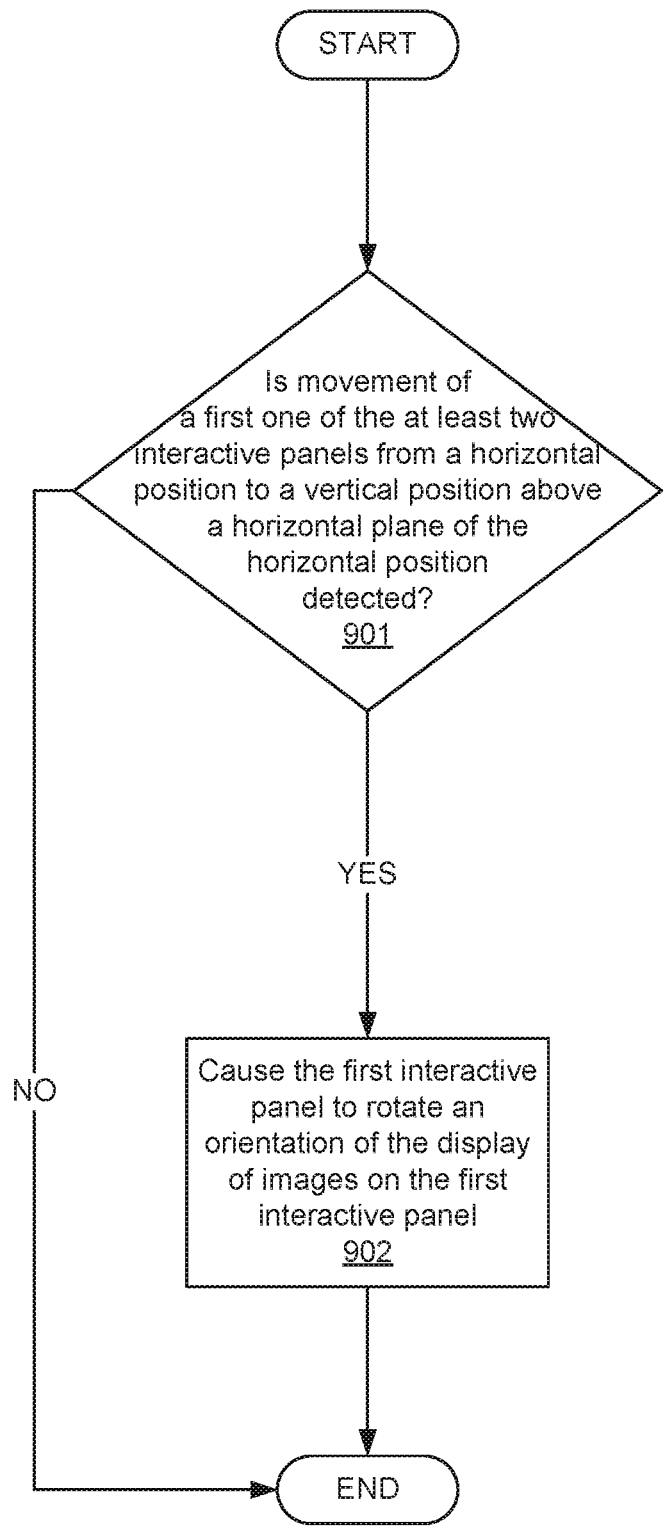
FIG. 9 is a flowchart depicting a method of controlling the function of a modular electronic desk, according to yet another example of the principles described herein.

FIG. 9 is a flowchart depicting a method of controlling the function of a modular electronic desk (100), according to yet another example of the principles described herein. The method of FIG. 9 may include determining (block 901) if movement of a first one of at least two interactive panels (100) from a horizontal position to a vertical position above a horizontal plane of the horizontal position is detected. As mentioned above in connection with FIGS. 3 and 4, the electronic desk (100) may be configured in an L-shape to provide for a first one of the interactive panels (101) to function as a display device to a seated user. In response to a detection of movement of the first one of the interactive panels (101) from the horizontal position to the vertical position above the horizontal plane of the horizontal position (block 901, determination YES), causing the first interactive panel to rotate an orientation of the display of images on the first interactive panel. In response to not detecting movement of the first one of the interactive panels (101) from the horizontal position to the vertical position above the horizontal plane of the horizontal position (block 901, determination NO), the method may terminate.

In the examples described herein, additional features may be included or built into the interactive panels (101) including, for example, a wireless inductive charging unit beneath the interactive panels (101). The wireless inductive charging unit allows a user to charge another device such as a smart phone or tablet while using the electronic desk (100). Other additional features may include, for example, proximity sensors included in the interactive panels (101) that indicate a location of a user next to the electronic desk. In this example, the electronic desk may use the proximity sensors to trigger the appearance of a login screen to allow the user within proximity to log into their virtual machine (102). In another example, the interactive panels (101) of the electronic desk (101) may also include at least one position and orientation sensor. The position and orientation sensors may be used by the orientation module (121) to detect a change in orientation of the interactive panels (101).

In still another example, environmental and biometric sensors may be included in the interactive panels (101). The environmental and biometric sensors may be used to detect and report environmental properties such as an ambient temperature or humidity level, as well as detect and report a user's biometric properties such as, for example, heart rate or blood pressure. In yet another example, the interactive panels (101) of the electronic desk (100) may include high-speed communication devices that allow other computing devices such as smartphones and tablet device, to communicate and exchange data with the electronic desk (100) and with each other. These other computing devices may handshake with the computing device (104) and allow the other computing devices to access data on the virtual machines (102) and/or computing device (104) using near-field communication (NFC), BLUETOOTH communication protocol distributed by the Bluetooth Special Interest Group, or other forms of communication. Further, a set of wheels may be included at the bottom of the support structure (201) to allow the desk to be turned in place or moved from one area of the office space to another.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by a computer usable program code. The computer usable program code may be provided to a processor of a general purpose computer, special purpose computer, or other programmable data processing apparatus to produce a machine, such that the computer usable program code, when executed via, for example, the processor (111) of the computing device (104) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

An electronic desk may include at least two interactive panels hinged to a support structure. The interactive panels are hingeably positionable in at least a horizontal and vertical position. The electronic desk further includes a computing device to provide computing resources to the interactive panels. A plurality of virtual machines interfaceable at the interactive panels may be included in the computing device. At least one virtual machine is to be formed in the computing device in response to detecting a request from a second user logging onto the computing device via one of the interactive panels after a first user has logged onto the computing device. The computing device is to provide additional input interfaces on the at least two interactive panels associated with each of the at last one of the virtual machines of the computing device.

The electronic desk provides users with modularity in their workspace, allows them to effectively manage the workspace, and increases use of the office space. The electronic desk also provides a modular workspace that may be quickly reconfigured and used in another manner without incurring any additional expenses associated with the hiring of professionals to perform the reconfiguration. In its various configurations and modes, the electronic desk facilitates individual productivity, brainstorming sessions in smaller groups, and even larger collaboration groups. The electronic desk may be incorporated in a variety of office spaces including conference rooms, classrooms, libraries, leisure areas, and retail environments, among other locations. The electronic desk also allows users to build a personalized desk or workspace layout. Further, the amount of cables and wires associated with the computer hardware is minimized, reducing clutter in the office environment.

The preceding description has been presented to illustrate and describe examples of the principles described. This description is not intended to be exhaustive or to limit these principles to any precise form disclosed. Many modifications and variations are possible in light of the above teaching.

What is claimed is:

1. An electronic desk comprising:
    at least two interactive panels hinged to a support structure, the interactive panels being hingeably positionable in at least a horizontal and vertical position;
    a computing device to provide computing resources to the interactive panels; and
    a plurality of virtual machines of the computing device interfaceable at the interactive panels,
    wherein at least one of the virtual machines is to be formed in the computing device in response to detecting a request from a second user logging onto the computing device via one of the interactive panels after a first user has logged onto the computing device, and
    wherein the computing device is to provide an additional input interface on the at least two interactive panels associated with each of the at least one of the virtual machines of the computing device.

2. The electronic desk of claim 1, wherein at least one of the interactive panels is adjustable to a vertical position below a horizontal plane of the horizontal position.

3. The electronic desk of claim 1, wherein the at least one of the interactive panels is adjustable between vertical positions above and below a horizontal plane of the horizontal position anywhere along at least 180 degrees.

4. The electronic desk of claim 1, wherein at least one of the interactive panels is a flexible interactive panel that creates a curved display when the flexible interactive panel is adjusted to a vertical position above a horizontal plane of the horizontal position.

5. The electronic desk of claim 1, wherein the computing device is integrated into the interactive panels.

6. The electronic desk of claim 1, wherein cabling is integrated into the support structure to provide power and communication capabilities to the interactive panels.

7. The electronic desk of claim 1, wherein at least one of the interactive panels is a touch screen device.

8. The electronic desk of claim 1, wherein the interactive panels communicate with the computing device using wireless communications.

9. A modular interactive desk comprising:
- at least one touch screen display device rotatably coupled to a support structure of the interactive desk, the at least one display device being rotatable up to 270 degrees about an axis of rotation;
- computer hardware providing computing resources to the at least one touch screen display device;
- a plurality of virtual machines of the computer hardware created based on a number of users logged onto the computing device via the at least one touch screen display device,
- wherein each virtual machine provides a set of individual input interfaces displayed on the at least one touch screen display device.

10. The modular interactive desk of claim 9, wherein:
- the at least one touch screen display device rotatably coupled to the support structure of the interactive desk is adjustable to a vertical position above a horizontal plane of a horizontal position of the at least one touch screen display device, and
- the at least one touch screen display device is a flexible touch screen device that is flexible to a curved state to create a curved touch screen display device vertically positioned above at least a second touch screen display device that is oriented at the horizontal position.

11. The modular interactive desk of claim 9, wherein a first one of the at least one touch screen display device is adjustable from a horizontal position to a vertical position below a horizontal plane of the horizontal position and a second one of the at least one touch screen display device is adjustable from the horizontal position to a vertical position above the horizontal plane of the horizontal position to form an interactive vertical board.

12. A computer program product for controlling the function of a modular electronic desk, the computer program product comprising:
- a non-transitory computer readable storage medium comprising computer usable program code embodied therewith, the computer usable program code to, when executed by a processor:
  - determine if a request is made from a second user to log onto a computing device associated with at least two interactive panels rotatably coupled via at least one hinge of a support structure of the electronic desk, the request being received via one of the interactive panels after a first user has logged onto the computing device via one of the interactive panels;
  - in response to detecting the request from the second user logging onto the computing device:
    - create a plurality of virtual machines associated with the computing device; and
    - provide additional input interfaces on the at least two interactive panels associated with each of the virtual machines of the computing device created.

13. The computer program product of claim 12, further comprising computer usable program code to, when executed by the processor:
- determine if movement of a first one of the at least two interactive panels from a horizontal position to a vertical position below a horizontal plane of the horizontal position and movement of a second one of the at least two interactive panels from a horizontal position to a vertical position above a horizontal plane of the horizontal position are detected; and
- in response to a detection of movement of the first one of the interactive panels from the horizontal position to the vertical position below the horizontal plane of the horizontal position and detection of movement of the second one of the at least two interactive panels from the horizontal position to a vertical position above a horizontal plane of the horizontal position, instruct the first and second interactive panels to function as a single display device.

14. The computer program product of claim 12, further comprising computer usable program code to, when executed by the processor:
- determine if a coupling of a subsequent electronic desk to the electronic desk is detected; and
- in response to a detection of the coupling of the subsequent electronic desk to the electronic desk, communicate data between the subsequent electronic desk to the electronic desk as a daisy-chain network topology.

15. The computer program product of claim 12, further comprising computer usable program code to, when executed by the processor:
- determine if movement of a first one of the at least two interactive panels from a horizontal position to a vertical position above a horizontal plane of the horizontal position is detected; and
- in response to a detection of movement of the first one of the interactive panels from the horizontal position to the vertical position above the horizontal plane of the horizontal position, cause the first interactive panel to rotate an orientation of the display of images on the first interactive panel.

* * * * *